United States Patent [19]

Rubinstein

[11] 4,176,866

[45] Dec. 4, 1979

[54] STANDARDIZED GLAND ASSEMBLY FOR CABLE CONNECTIONS

[75] Inventor: Solomon Rubinstein, Fanwood, N.J.

[73] Assignee: General Cable Corporation, Greenwich, Conn.

[21] Appl. No.: 906,743

[22] Filed: May 17, 1978

[51] Int. Cl.$^2$ .............................................. F16L 25/00
[52] U.S. Cl. ..................................... 285/421; 285/342
[58] Field of Search .............. 285/341, 342, 343, 353, 285/385, 389, 393, 421, 177

[56] References Cited

U.S. PATENT DOCUMENTS

| | | | |
|---|---|---|---|
| 974,804 | 11/1910 | McCabe | 285/342 |
| 1,497,453 | 6/1924 | Levitt | 285/343 X |
| 1,989,674 | 2/1935 | Boas et al. | 285/342 |
| 2,564,302 | 8/1951 | Fraser | 285/342 X |
| 2,857,176 | 10/1958 | McTaggart et al. | 285/342 X |
| 3,453,009 | 7/1969 | Campbell | 285/385 X |
| 3,851,903 | 12/1974 | Nienhaus et al. | 285/421 X |
| 3,895,831 | 7/1975 | Fisher | 285/341 |

FOREIGN PATENT DOCUMENTS

| | | | |
|---|---|---|---|
| 1216436 | 4/1960 | France | 285/342 |
| 1321483 | 2/1963 | France | 285/343 |

Primary Examiner—Mervin Stein
Assistant Examiner—Carl Pietruszka
Attorney, Agent, or Firm—Roy C. Hopgood; John M. Calimafde; Charles W. Neill

[57] ABSTRACT

This improved gland assembly is primarily for use with mineral insulated cables. The same gland body and lock nut is used for cables regardless of the cable diameter. The dimensions of the compression ring are the same, except for the ring bore, which matches the diameter of the cable. The lock nut bottoms on a shoulder to prevent overtightening of the nut and risk of fracturing the sheath of the cable.

7 Claims, 4 Drawing Figures

STANDARDIZED GLAND ASSEMBLY FOR CABLE CONNECTIONS

BACKGROUND AND SUMMARY OF THE INVENTION

This invention is primarily for use with mineral insulated ("MI") cables. Such cables have an outer metal sheath, generally made from a copper tube. One or more conductors are located at a central region of the cross-section of the interior of the copper tube, and these conductors are insulated from the metal sheath and from each other by mineral insulation such as magnesium oxide which fills the interior of the copper tube and which spaces the conductors from the inside wall of the tube and also spaces the conductors from one another when the cable contains more than one conductor.

At terminations of such cables, the end portion of the cable is inserted into a gland assembly; and is secured to the gland assembly by a compression ring which surrounds the circumference of the cable. The compression ring is wedged against the outside of the cable sheath, and the inner end of the cable extends into a chamber in the gland assembly which provides a space for a "pot" threaded over the end of the cable sheath with the conductor of the cable extending beyond the gland and pot.

The purpose of the pot is to hold a sealant in contact with the end of the cable sheath and across the exposed surface of the mineral insulation before the cable is installed in a circuit.

Gland assemblies for mineral insulated cables were made in different sizes for cables of different size.

This invention provides a gland assembly using the same size gland body and lock nut for any cable within a range of different cable sizes. The lock nut clamps a compression ring against the outside of the cable to secure the gland assembly to the cable; and these compression rings are all of the same outside diameter, but each compression ring must have an inside diameter corresponding to the diameter of the cable. Inventory is substantially reduced with resulting savings in expense to suppliers of the gland assemblies.

Lock nuts used in gland assemblies of the prior art screwed over the gland body and forced compression rings into contact with the outside of the cable. When the lock nuts were over-tightened, the compression ring would sometimes fracture the sheath of the cable. The present invention has a surface against which the lock nut bottoms to prevent over-tightening and resulting excess pressure on the compression ring.

It is a feature of the invention that the compression rings are annealed and made of metal which is capable of some cold flow when securing the gland assembly of this invention to a mineral insulated cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
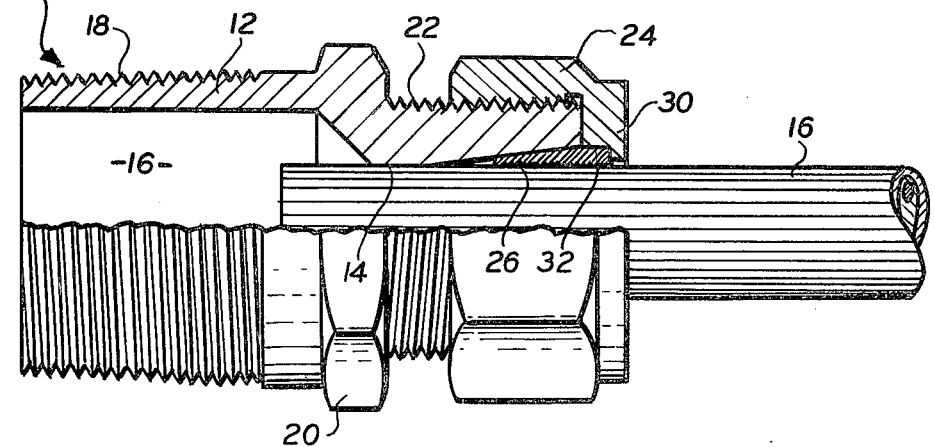
FIG. 1 is a side elevation, partly broken away and in section, showing a gland assembly of the prior art for use on mineral insulated cables.

FIG. 1 shows a gland assembly 11 consisting of a gland body 12 with a bore 14 into which a cable 16 is inserted. The bore 14 opens into a chamber 17, which is concentric with the bore 14 and which is surrounded by a wall having threads 18 for screwing into a connector box or switch box of an electrical wiring system.

The gland assembly 11 has a hexagonal portion 20 for receiving a tool; and has a threaded surface 22 on which a lock nut 24 is screwed. There is a compression ring 26 which fits over the circumference of the cable 16 and which has a tapered circumferential surface that matches a tapered inside surface of the bore 14.

The lock nut 24 is formed with a flange 30, which extends across the end face of the annular wedge 26, for forcing the wedge 26 to move axially as the screw 24 is threaded over the threads 22. The wider end of the compression ring 26 is shown fitting into an annular socket in the inner diameter surface of a flange 30 in FIG. 1. In FIG. 1 the axial length of the compression ring 26 is such that by overtightening the lock nut 24 from the pushing of flange 30, the compression ring 26 may become too deeply embedded in the sheath on cable 16, thus causing a potential troublesome condition. With the construction shown in FIG. 1, it was necessary to have a different size of gland assembly for each different size of cable 16.

Figure 2:
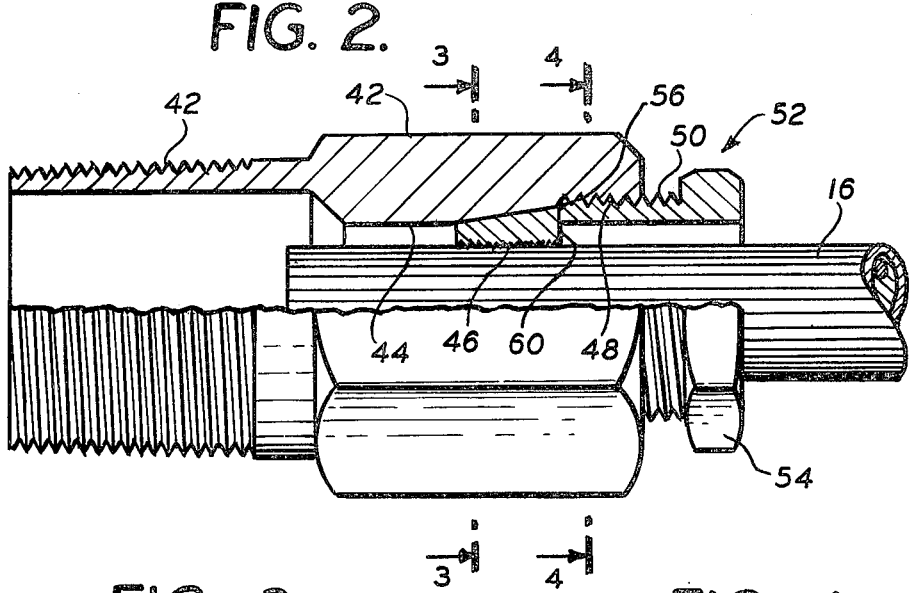
FIG. 2 is a view similar to FIG. 1, but showing the improved construction for accommodating the same size of gland assembly to cables of different diameter.

FIG. 2 shows the improved construction of the present invention. This gland assembly includes a gland body 42 having a bore 44 which is the same for every size of cable with which the gland assembly of FIG. 2 is intended to be used. An adjacent portion of the bore 44 is tapered to accommodate a wedge-shaped compression ring 46 which has a cylindrical inner surface for contact with the cable 16. The bore 44 has a somewhat larger diameter toward its right-hand end (as viewed in FIG. 2), and this enlarged portion 48 of the bore 44 is threaded to receive threads 50 on a lock nut 52, which has a hexagonal flange 54 for receiving a tool.

At the left-hand end of the enlarged diameter portion 48 of the bore 44, there is a shoulder 56; and the end face of the lock nut 52, which confronts the end face 56, extends inwardly beyond the outer circumference of the clamping ring 46 so as to overlap an end face 60 of the compression ring 46.

When the assembly shown in FIG. 2 is first brought together, the compression ring 46 is loose on the cable 16 and so is the nut 52. The cable 16 is inserted as far as necessary into the gland assembly for connection with a conventional pot; and then the compression ring 46 is moved toward the left and into contact with the tapered inside surface of the bore 44 and is moved along the cable toward the left to bring it into an initial clamping engagement with the sheath of the cable 16.

The lock nut 52 is then screwed into the threads at 48 and into contact with the end face 60 of the compression ring 46. As the lock nut 52 is advanced further toward the shoulder or end face 56, it pushes the clamping ring 46 along the tapered surface in the gland body and forces the compression ring into friction contact with the outside surface of the cable 16. While all of the other parts of the gland assembly, shown in FIG. 2, can be used on cables of different sizes, the compression ring 46 will have the same outside circumference for any size of cable, but will have greater radial thickness so that when the outside tapered circumference is in contact with the tapered portion of the bore 44, the inside circumference of the compression ring 46 will bear against the surface of the cable 16 with the maximum desired pressure against the cable when the left-hand end of the lock nut is in contact with the shoulder or end face 56.

Because of the fact that the compression rings used for cables of smaller diameter have the same outside diameter as the compression ring 46 shown in FIG. 2, and have smaller inside diameters to accommodate smaller cables, the radial thickness of the different compression rings is different. In order to prevent these differences in thickness from causing excessive tightening torques, the material used to make the rings is annealed, so that it is soft and there is no excessive pressure required from the lock nut 52, to force the compression ring along the tapered inside space of the gland body and into clamping contact with the sheath of the cable. Preferably, all of the compression rings supplied for cables of different size are annealed. Theoretically, the compression rings for the largest size cable might not be annealed, and the compression rings for cables of smaller size could be annealed to distort as necessary to clamp the cable with substantially the same pressure exerted against the compression rings by the lock nut 52.

The construction of this invention meets the established standards for mineral insulated cable gland assemblies. All samples withstood a dead load of 150 pounds for 5 minutes without slipping prior to conducting the pull-out tests (Underwriters Laboratories requirement). All samples met the tightening torque requirements described by U.S. Standard 514, ¶ 250.

Satisfactory pull-out results were obtained on prototype gland assemblies with annealed compression rings. In the gland construction of this invention, the wall of the compression ring is made correspondingly thicker to compensate for each successively smaller outside diameter cable. Annealing of the compression ring is required for it to be deformed slightly as it is being wedged between the cable and the tapered portion of the bore in the gland body, as already explained.

Figures 3, 4:
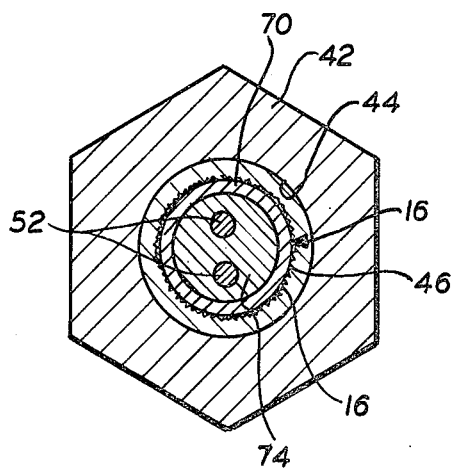
FIGS. 3 and 4 are sectional views taken on the lines 3—3 and 4—4, respectively, of FIG. 2.

FIGS. 3 and 4 are sectional views taken on FIG. 2. Parts shown in FIG. 2 are designated by the same reference characters in FIGS. 3 and 4. The cable 16 is shown in section with the sheath designated by the reference character 70 and two conductors designated by the reference characters 52. The mineral insulation that separates the conductors 22 from one another and from the sheath 70 is indicated by the reference character 74.

The preferred embodiment of the invention has been illustrated and described, but changes and modifications can be made, and some features can be used in different combinations without departing from the invention as defined in the claims.

What is claimed is:

1. Apparatus for clamping a metal sheathed cable to a gland body having a longitudinally extending opening therein, and a bore constituting a portion of the length of the said opening and constituting a portion of the opening that is of minimum cross-section and into which electrical cables of different size are inserted for connecting the cables with a box of an electrical wiring system, means on one end of the gland body for connecting it with said box, the bore having a tapered cross-section for at least a part of its length, an annular, metallic, clamping ring having a cylindrical inside diameter smaller than the minimum diameter of the bore and that fits around a cable of an outside diameter that fits into the clamping ring for connection with the gland body, the clamping ring having an outside surface with a taper that contacts with the tapered surface of the bore at an axial location corresponding generally to the tapered surface of the bore whereby pressure between the tapered surfaces of the bore and clamping ring is transmitted directly through the metal of the clamping ring and into contact with an outside surface of the cable sheath of a cable in the ring, a pressure element connected with the gland body and movable in a direction to exert axial pressure on the clamping ring for distorting the metal of the clamping ring axially by cold flow into progressively greater pressure with the circumferential surface of the cable, the ring being annealed to a hardness proportional to the mean radial thickness of the ring to facilitate greater distortion of the ring as a result of greater mean radial spacing of the tapered surface of the gland body from the circumference of the outside surface of the cable, the pressure element having an end face that confronts an end face of the ring at the end of the ring which has the greater diameter of the tapered surface for thrusting the end face of the ring axially to distort the annealed metal of the ring to flow axially into clamping contact with the metal sheath of the cable, said end face of the pressure element having an area that will extend over a clamping ring of smaller inside diameter, greater wall thickness, and annealed to lesser hardness for clamping a smaller ring to hold a smaller diameter of cable clamped in the gland.

2. The apparatus described in claim 1 characterized by the end of the clamping ring of greater wall thickness being annealed in accordance with its maximum wall thickness being located at approximately the larger end of the tapered surface of the bore to prevent any cold flow of the metal of the ring in a radial outward direction and to permit cold flow of the metal into clamping contact with the outside diameter of the cable sheath when the ring is forced along the tapered inside surface of the gland body.

3. The apparatus described in claim 1 characterized by the pressure element having threads that fit complementary threads in the gland body for advancing the pressure element into contact with the clamping ring, and the end bore in the gland body being of larger diameter than the maximum diameter of the tapered portion so that there is a shoulder in the gland body at the inner end of the threaded portion and against which a confronting face of the pressure element comes into contact to limit the extent to which the pressure element can be screwed into the gland body.

4. The apparatus described in claim 3 characterized by the confronting end face of the pressure element being of substantially greater vertical extent than the shoulder at the end of the threads, and said confronting face extending inwardly beyond the circumference of the larger end of the tapered portion of the bore and into position to overlap a confronting end face of the clamping ring to push the clamping ring axially toward the smaller diameter end of said tapered portion.

5. The apparatus described in claim 4 characterized by the taper of the clamping ring being correlated with the spacing of the tapered portion of the bore from the outside surface of a cable with which the clamping ring is intended to be used, so that the cable is clamped to the Underwriters Laboratories requirement when the end face of the pressure element is in firm contact with the shoulder at the inner end of the threads in the gland body bore.

6. The apparatus described in claim 1 characterized by the pressure element being an externally threaded bushing with a radially-extending shoulder in position to contact with a shoulder of the gland body before the clamping ring has been moved by said threaded bushing into position to exert excessive pressure on the cable.

7. The apparatus described in claim 6 characterized by the cable being a minerally insulated cable with a metal sheath, and a conductor within the sheath, and insulation holding the conductor out of contact with the sheath and insulated therefrom, the shoulder on the bushing being in position to contact with a surface of the gland body before the compression ring exerts enough pressure on the sheath of the cable to damage the sheath.

* * * * *